United States Patent
Hiramoto (10) Patent No.: US 7,131,726 B2
(45) Date of Patent: Nov. 7, 2006

(54) SPECTACLE FRAME AND LENS HANGER

(75) Inventor: Kiyoshi Hiramoto, Hiroshima (JP)

(73) Assignee: 21 (Two-One) Co., Ltd., Hiroshima (JP)

( * ) Notice: Subject to any disclaimer, the term of this patent is extended or adjusted under 35 U.S.C. 154(b) by 0 days.

(21) Appl. No.: 11/105,361

(22) Filed: Apr. 14, 2005

(65) Prior Publication Data

US 2006/0017882 A1    Jan. 26, 2006

(30) Foreign Application Priority Data

Jul. 20, 2004    (JP)    .............................. 2004-212154

(51) Int. Cl.
G02C 9/02    (2006.01)
(52) U.S. Cl. .............................. 351/59; 351/47; 351/57
(58) Field of Classification Search .................. 351/59, 351/47, 57, 41, 58, 48, 158
See application file for complete search history.

(56) References Cited

U.S. PATENT DOCUMENTS

| | | | | |
|---|---|---|---|---|
| 1,181,291 | A | * | 5/1916 | Clarke .......................... 351/47 |
| 1,545,281 | A | * | 7/1925 | Royak .......................... 351/59 |
| 2,786,390 | A | * | 3/1957 | Zanetti ......................... 351/59 |
| 3,238,005 | A | * | 3/1966 | Petitto ......................... 351/59 |
| 3,252,747 | A | * | 5/1966 | Robins ........................ 351/59 |
| 3,383,707 | A | * | 5/1968 | McNeill .......................... 2/12 |
| 3,990,788 | A | * | 11/1976 | Choy ........................... 351/59 |
| 4,196,981 | A | * | 4/1980 | Waldrop ....................... 351/59 |
| 4,740,069 | A | * | 4/1988 | Baum .......................... 351/57 |
| 5,598,232 | A | | 1/1997 | Pronesti |
| 5,652,636 | A | | 7/1997 | Feinbloom |
| 5,694,193 | A | | 12/1997 | Murphy et al. |
| 5,894,336 | A | | 4/1999 | Baldissarutti |
| 6,135,593 | A | * | 10/2000 | Moyse ......................... 351/41 |
| 6,264,325 | B1 | * | 7/2001 | Peressini et al. .............. 351/59 |
| 6,357,874 | B1 | | 3/2002 | Miyazawa |
| 2002/0093622 | A1 | * | 7/2002 | Tostado ....................... 351/57 |
| 2004/0012756 | A1 | | 1/2004 | Hiramoto |

FOREIGN PATENT DOCUMENTS

DE    19515238    3/1996

(Continued)

OTHER PUBLICATIONS

International Search Report from the European Patent Office dated Sep. 29, 2005 of corresponding European Patent Application No. 05008217.1.

(Continued)

*Primary Examiner*—Hung Xuan Dang
(74) *Attorney, Agent, or Firm*—Finnegan, Henderson, Farabow, Garrett & Dunner LLP.

(57) ABSTRACT

A spectacle frame according to the present invention includes a pair of lens hangers each having a lens connector at a distal end thereof, and a pair of fixing barrels for supporting proximal ends of the lens hangers to be rotatable on a leftward/rightward axis, and joined to a brow bar. The fixing barrel has a supporting hole extending leftward/rightward, an outer circumference concentric with the supporting hole, having a predetermined radius of curvature, and an annular groove formed on the outer circumference. The lens hanger which is made of a metallic wire has a shaft portion fit in a rotatable manner into the supporting hole of the fixing barrel, an engagement portion engageable with the annular groove of the fixing barrel, and a spring portion formed between the shaft portion and the engagement portion to elastically bias the engagement portion toward the annular groove.

12 Claims, 8 Drawing Sheets

FOREIGN PATENT DOCUMENTS

| | | |
|---|---|---|
| EP | 0838711 | 4/1998 |
| FR | 2753283 | 3/1998 |
| GB | 452266 | 8/1936 |
| GB | 698066 | 10/1953 |
| WO | WO 2004/070454 | 8/2004 |

OTHER PUBLICATIONS

"Examiner's first report on patent application no. 2005301569," Australian Patent Office, Jan. 25, 2006, 3 pages.

"Examiner's first report on patent application no. 2005201569," Australian Patent Office, Jan. 25, 2006, 3 pages.

* cited by examiner

SPECTACLE FRAME AND LENS HANGER

This application claims priority from Japanese Patent Application No. 2004-212154 filed on Jul. 20, 2004 which is incorporated hereinto by reference.

BACKGROUND OF THE INVENTION

1. Field of the Invention

The present invention relates to a spectacle frame and a lens hanger removably attached to the spectacle frame.

2. Description of the Related Art

When a wearer of spectacle lenses for accommodating one's eyesight uses sunglasses, polarizing sunglasses, a loupe or aged person's spectacles, it necessary to newly buy exclusively adjusted sunglasses, polarizing sunglasses, loupe or aged person's spectacles. The purchase thereof not only burdens the buyer with the economical load but also troubles him regarding the replacement. Accordingly, in the prior art, there are many proposals wherein additional spectacle lenses such as sunglasses, polarizing sunglasses or a loupe are used while covering the former on the top of the presently used spectacle lenses in the spectacle frame.

In Japanese Unexamined Patent Publication (Kokai) No. 11-264956, subsidiary sunglasses removably attached to a spectacle frame are disclosed. According to this invention, the frame of the subsidiary sunglasses is put into a brow bar or a brace bar to be openable and closable relative to the spectacle frame by the elasticity of spring members incorporated in the subsidiary sunglasses. According to this subsidiary sunglasses, it is possible to use the spectacle lenses alone or together with the subsidiary sunglass if necessary.

The jumping-up type subsidiary sunglasses disclosed by the Japanese Unexamined Patent Publication (Kokai) No. 11-264956 are of a general purpose type usable for various spectacle frames in a relatively wider range. Particularly, those having the openable/closable function, however, are liable to increase their weights due to the incorporation of the spring members or others. Accordingly, there is an inconvenience particularly in recent spectacle frames having a reduced weight in that a sense of incompatibility in design is significant and also a weight balance is no good, whereby the spectacle frame may slip off during the wearing. In addition, the spectacle frame is not so good in wearing sense, has a number of fine parts and is inferior in durability.

When one wearing the spectacles uses a microscope or a telescope, particularly through an eyepiece having a short eye point, it is necessary to remove the spectacles, whereby the operability is often extremely worsened. To eliminate such a trouble, jumping-up type spectacle frames are proposed in Japanese Unexamined Patent Publication (Kokai) No. 10-115811 or others. The jumping-up type spectacle frame disclosed in the Japanese Unexamined Patent Publication (Kokai) No. 10-115811 is capable of opening and closing rims to which spectacle lenses are attached are openable and closable relative to the brow bar of the spectacle frame.

The jumping-up type spectacle frame disclosed in the Japanese Unexamined Patent Publication (Kokai) No. 10-115811 has a structure so that left and right rims are opened or closed while being integral with each other. To stop the rims at an optional rotational position, it is necessary to incorporate a balancer using, for example, torsion coil springs in correspondence to weights of the rims and the lenses or to impart a strong frictional force to the rotational center. The construction incorporating the balancer has a drawback in that the number of parts becomes large to increase the weight thereof and the appearance of the spectacle frame is worsen. On the other hand, in the construction wherein the rotational position of the rims is maintained by the frictional force, it is difficult to jump up the spectacle lenses by a weak force, which deteriorates the operational feeling of the spectacle frame. In addition, it becomes gradually difficult to maintain the jumping-up state of the spectacle lenses due the wearing of the rotational parts. Also, it is necessary to frequently adjust the jumping-up mechanism.

SUMMARY OF THE INVENTION

An object of the present invention is to provide a light weight spectacle frame capable of independently opening and closing left and right spectacle lenses and a lens hanger removably attached to this spectacle frame.

Another object of the present invention is to provide extremely lightweight subsidiary sunglasses of a jumping-up type and an exclusive spectacle frame capable of attaching the same.

A first aspect of the present invention which can achieve the above-mentioned objects is in a spectacle flame comprising a brow bar coupled temples to lug sections at left and right ends thereof via hinges, respectively, and a pair of fixing barrels joined to the brow bar and supporting proximal ends of lens hangers to be rotatable on a leftward/rightward axis, distal ends of the lens hangers being attached to spectacle lenses, respectively, wherein the fixing barrel has a supporting hole extending leftward/rightward, an outer circumference concentric with the supporting hole, having a predetermined radius of curvature, and an annular groove provided on the outer circumference to be concentric with the supporting hole.

In the present invention, the proximal end of the lens hanger carrying the necessary spectacle lens is attached to the fixing barrel joined to the brow bar of the spectacle frame to rotate the lens hanger about the supporting hole of the fixing barrel if necessary, whereby the left and right spectacle lenses are openable and closable independently from each other.

According to the spectacle frame of the first aspect of the present invention, the fixing barrel supporting the proximal end of the lens hanger becomes significantly compact and the degree of freedom in design of the spectacle frame increases as well as the weight reduction of the jumping-up type spectacle frame is facilitated. In addition, since the left and right spectacle lenses are openable and closable independent from each other, the observation by a single eye, for example, through a microscope or a telescope, the shooting, the visibility training or the eye makeup is enhanced.

In the spectacle frame according to the first aspect of the present invention, the fixing barrel may further comprise a stopper portion provided in part of the annular groove, for restricting the rotation of the lens hanger at a lens-using position defined at one of rotary ends of the lens hanger.

In such a case, since the rotation of the lens hanger is restricted at the lens-using position which is one of the rotational ends of the lens hanger, the spectacle lens is usable while always being maintained at a correct rotational position.

The fixing barrel may further comprise a cut-off portion provided in part of the outer circumference thereof, for facilitating the detachment of the lens hanger at a lens-removal position defined at the other rotary end of the lens hanger.

In such a case, the lens hanger is easily removable from the fixing barrel of the brow bar at the lens-removal position which is the other rotational end of the lens hanger. Thereby, if the user has prepared a lens hanger carrying the desired spectacle lens, such as a dioptral sunglass, a polarized sunglass, a loupe or a farsighted glass, it is possible to extremely easily put the lens hanger carrying the desired spectacle lens on the fixing barrel on the brow bar of the spectacle frame. Accordingly, there is no need to purchase separate spectacle frames for individual spectacle lenses.

A second aspect of the present invention is in a spectacle frame comprising a brow bar coupled temples to lug sections at left and right ends thereof via hinges, respectively, a pair of lens hangers, each having a lens mounting portion at a distal end thereof, and a pair of fixing barrels joined to the brow bar and supporting proximal ends of the lens hangers to be rotatable on a leftward/rightward axis, wherein the fixing barrel has a supporting hole extending leftward/rightward, an outer circumference concentric with the supporting hole, having a predetermined radius of curvature, and an annular groove formed on the outer circumference, and wherein the lens hanger is made of a metallic wire and has a shaft portion fit in a rotatable manner into the supporting hole of the fixing barrel, an engagement portion engageable with the annular groove of the fixing barrel, and a spring portion provided between the shaft portion and the engagement portion to elastically bias the engagement portion toward the annular groove.

In the present invention, the shaft portion of the lens hanger carrying a necessary spectacle lens is fit into the supporting hole of the fixing barrel joined to the brow bar of the spectacle frame, and the engagement portion of the lens hanger is pressed to the annular groove of the fixing barrel by the spring portion of the lens hanger, whereby the lens hanger is coupled to the fixing barrel. The opening and closing of the left and right spectacle lenses are carried out independently from each other by rotating the lens hanger about the supporting hole of the fixing barrel if necessary.

According to the spectacle frame of the second aspect of the present invention, the weight of the lens hanger to which the spectacle lens is attached is significantly reduced. In addition, it is possible to compact a portion of the spectacle frame for supporting the lens hanger, whereby the degree of design freedom of the spectacle frame increase as a whole.

In the spectacle frame according to the second aspect of the present invention, the spectacle frame may further comprise a bridge for coupling the left and right lens hangers together to be an integral body via the lens mounting portions.

In such a case, the rigidity of the lens hanger is more enhanced and the opening/closing operation of the left and right spectacle lenses is more stabilized.

In the spectacle frame according to the first or second aspect of the present invention, the spectacle frame may further comprise a pad arm connected to the brow bar at a proximal end thereof and having a nose pad attached to a distal end thereof.

In such a case, it is unnecessary to provide the pad arm for attaching the nose pad to the lens hanger, whereby it is possible to contemplate the reduction of the weight of the lens hanger to which the spectacle is attached. Also, while the spectacle frame is being worn, the nose pads are always in contact with a nose of the user even if the spectacle lens is opened or closed.

A third aspect of the present invention is in a lens hanger detachably attached to a fixing barrel joined to a brow bar of the spectacle frame according to the first aspect of the present invention at a proximal end thereof, the lens hanger having a lens mounting portion at a distal end thereof, and being made of metallic wires, the lens hanger comprising a shaft portion fit into a supporting hole of the fixing barrel in a rotatable manner, an engagement portion engaged with an annular groove of the fixing barrel, and a spring portion formed between the shaft portion and the engagement portion, involving an elastic force for biasing the engagement portion toward the annular groove.

In the present invention, the shaft portion of the lens hanger carrying the necessary spectacle lens is fit into the supporting hole of the fixing barrel joined to the brow bar of the spectacle frame at the lens-removal position, and the engagement portion of the lens hanger is pressed to the annular groove of the fixing barrel by the spring portion of the lens hanger to couple the lens hanger to the fixing barrel in a rotatable manner. When the spectacle lens is replaced, the lens hanger is made to rotate to the lens-removal and the shaft portion of the lens hanger is pulled out from the supporting hole of the fixing barrel. Then, the lens hanger carrying a new spectacle lens is fit into the supporting hole at the lens-removal position and the engagement portion of the lens hanger is pressed to the annular groove of the fixing barrel by the spring portion of the lens hanger, whereby the new lens hanger is coupled to the fixing barrel.

According to the lens hanger of the third aspect of the present invention, the weight of the lens hanger to which the spectacle lens is mounted is significantly reduced. Also, it is possible to extremely compact a portion of the spectacle frame for supporting the lens hanger, whereby the degree of design freedom of the spectacle frame increase as a whole.

In the lens hanger according to the third aspect of the present invention, the lens hanger may further comprise a bridge having left and right ends joined to lens mounting portions, respectively, wherein the left and right shaft portions are preferably orientated in the same direction.

In such a case, the rigidity of the lens hanger is more enhanced and the opening/closing operation of the left and right spectacle lenses is more stabilized. Further, the attachment and the detachment of the shaft portions of the pair of lens hangers may be carried out in the same direction relative to the supporting holes of the pair of fixing barrels so that the replacement of the spectacle lenses is easily and quickly carried out by the user himself without using a tool or others.

A fourth aspect of the present invention is in a spectacle frame comprising a brow bar coupled temple to lug sections at left and right ends thereof via hinges, respectively, pad arms joined to the brow bar at proximal ends thereof and carrying nose pads at distal ends thereof, main lens mounting portions provided midway of the pad arms, and a pair of fixing barrels joined to the brow bar so that a proximal end of a lens hanger which distal end is attached to a subsidiary spectacle lens lapped on main spectacle lens is rotatable on a leftward/rightward axis, wherein the fixing barrel has a supporting hole extending through the same in the leftward/rightward direction, an outer circumference concentric with the supporting hole, having a predetermined radius of curvature, and an annular groove formed on the outer circumference thereof.

In the present invention, the proximal end of the lens hanger carrying the necessary subsidiary spectacle lens is attached to the fixing barrel joined to the brow bar of the spectacle frame, and the lens hanger is made to rotate if necessary about the supporting hole of the fixing barrel to open or close the left and right subsidiary spectacle lenses independently from each other. The user may use the main spectacle lens only or the subsidiary spectacle lens lapped on the main spectacle lens.

According to the spectacle frame of the fourth aspect of the present invention, the fixing barrel supporting the proximal end of the lens hanger becomes significantly compact, and the degree of design freedom of the spectacle frame more increases. It is possible to facilitate the reduction of weight of the spectacle frame capable of attaching and detaching a jumping-up type subsidiary spectacle lens such as a sunglass, a polarized sunglass, a loupe or a farsighted convex lens.

In the spectacle frame according to the fourth aspect of the present invention, the fixing barrel may further comprise a cut-off portion formed in part of the outer circumference thereof, for facilitating the detachment of the lens hanger at a lens-removal position defined at one rotary end of the lens hanger.

In such a case, it is possible to easily remove the lens hanger from the fixing barrel of the brow bar at the lens-removal position which is defined at the other end of the lens hanger. Therefore, if the user has prepared the lens hanger carrying the subsidiary spectacle lens necessary for the user, it is possible for the user to extremely easily replace the lens hanger carrying the desired subsidiary spectacle lens if necessary.

a fifth aspect of the present invention is in a lens hanger detachably attached to a fixing barrel joined to a brow bar of a spectacle frame according to the fourth aspect of the present invention at a proximal end thereof, the lens hanger having a lens mounting portion at a distal end thereof, and being made of metallic wires, the lens hanger comprising a shaft portion fit into a supporting hole of the fixing barrel in a rotatable manner, an engagement portion engaged with an annular groove of the fixing barrel, and a spring portion formed between the shaft portion and the engagement portion, involving an elastic force for biasing the engagement portion toward the annular groove.

In the present invention, the shaft portion of the lens hanger carrying the necessary subsidiary spectacle lens is fit into the supporting hole of the fixing barrel joined to the brow bar of the spectacle frame at the lens-removal position so that the lens hanger is coupled to the fixing barrel in a rotatable manner while pressing the engagement portion of the lens hanger to the annular groove of the fixing barrel by the spring portion of the lens hanger. When the subsidiary spectacle lens is replaced, the lens hanger carrying the subsidiary spectacle lens is made to rotate to the lens-removal position and the shaft portion of the lens hanger is pulled out from the supporting hole of the fixing barrel. Then, another lens hanger carrying a new subsidiary spectacle lens is fit into the supporting hole of the fixing barrel at the lens-removal position so that the lens hanger is coupled to the fixing barrel while pressing the engagement portion of the lens hanger to the annular groove of the fixing barrel by the spring portion of the lens hanger.

According to the lens hanger of the fifth aspect of the present invention, it is possible to significantly reduce a weight of the lens hanger to which the subsidiary lens is attached. Also, it is possible to compact a portion of the spectacle frame for supporting the lens hanger, whereby the degree of design freedom of the spectacle frame increase as a whole.

In the lens hanger according to the fifth aspect of the present invention, the lens hanger may further comprise a bridge having left and right ends joined to subsidiary lens mounting portions, respectively, wherein the left and right shaft portions are preferably orientated in the same direction.

In such a case, the rigidity of the lens hanger is more enhanced and the opening/closing operation of the left and right spectacle lenses is more stabilized. Further, the attachment and the detachment of the shaft portions of the pair of lens hangers may be carried out in the same direction relative to the supporting holes of the pair of fixing barrels so that the replacement of the spectacle lenses is easily and quickly carried out by the user himself without using a tool or others.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The preferred embodiments of the inventive spectacle frame will be described in detail below with reference to FIGS. 1 to 8. In this regard, the present invention should not be limited to these embodiments but includes the combinations thereof as well as various changes and modifications contained in a concept of the present invention described in the scope of claim for the patent. Accordingly, the present invention, of course, is applicable to any other techniques within a spirit of the present invention.

Figure 1:
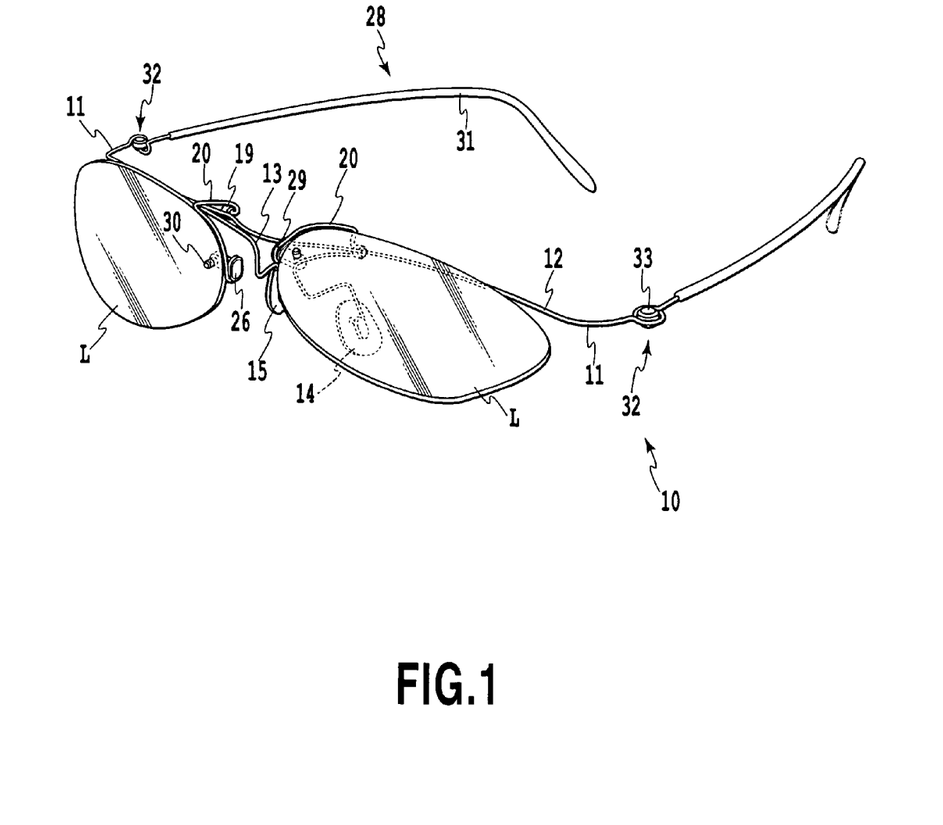
FIG. 1 is a perspective view illustrating the appearance of one embodiment of the inventive spectacle frame.
Figure 2:
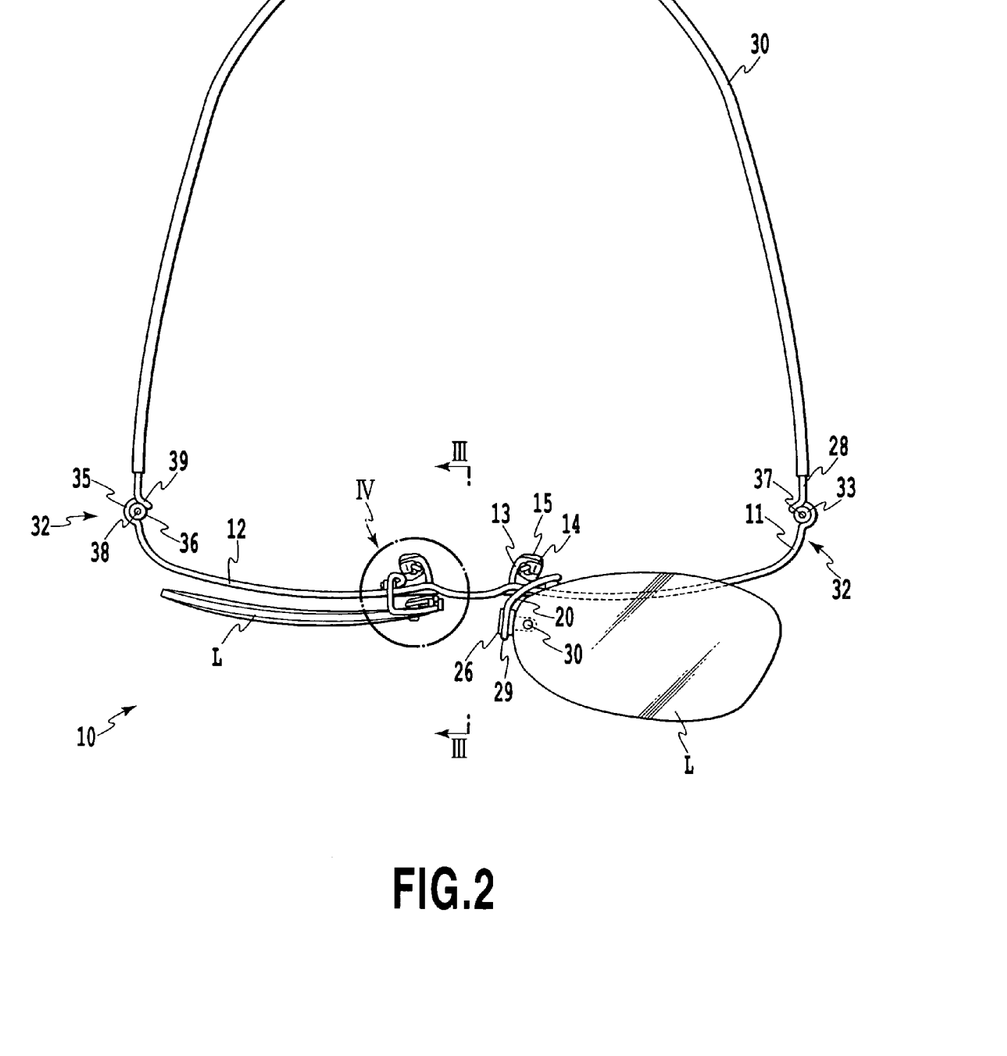
FIG. 2 is a plan view of the spectacle frame shown in FIG. 1.
Figure 3:
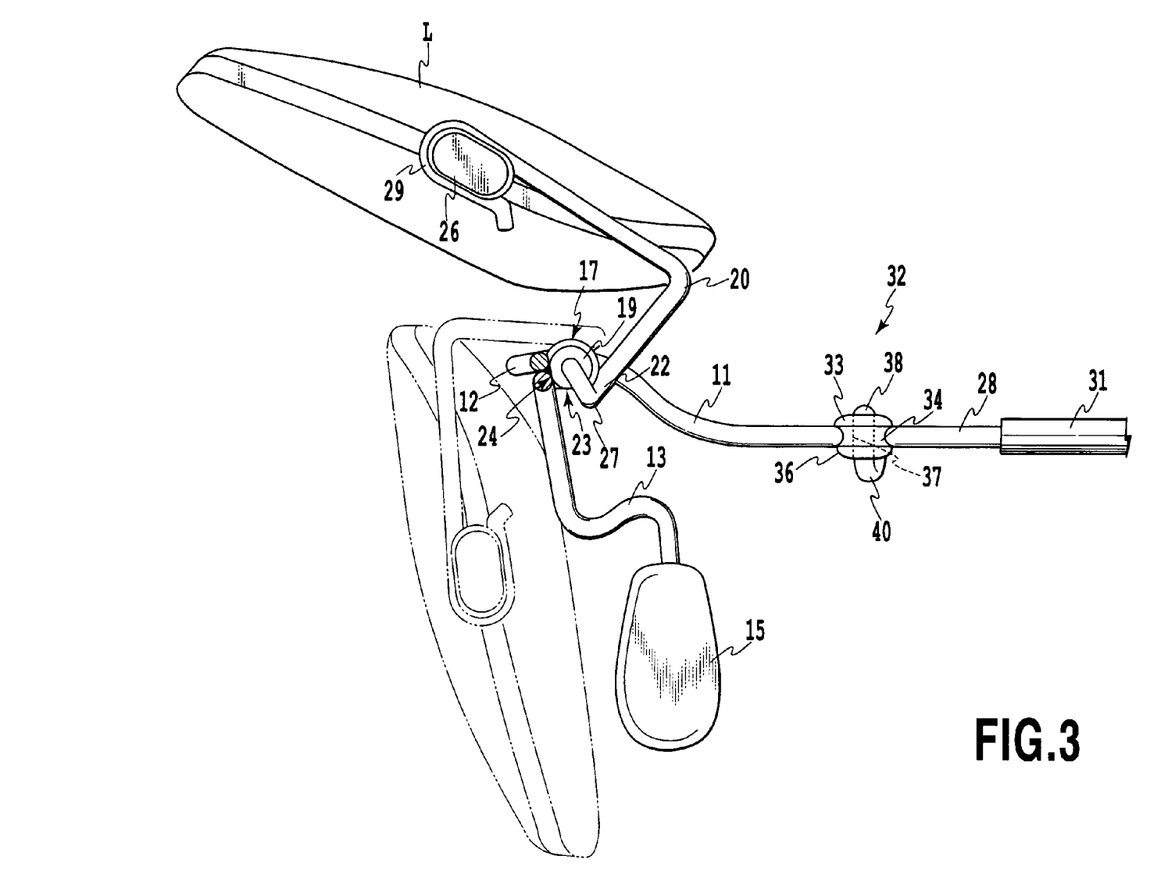
FIG. 3 is an enlarged view of a cross-section taken along a line III—III shown in FIG. 2.
Figure 4:
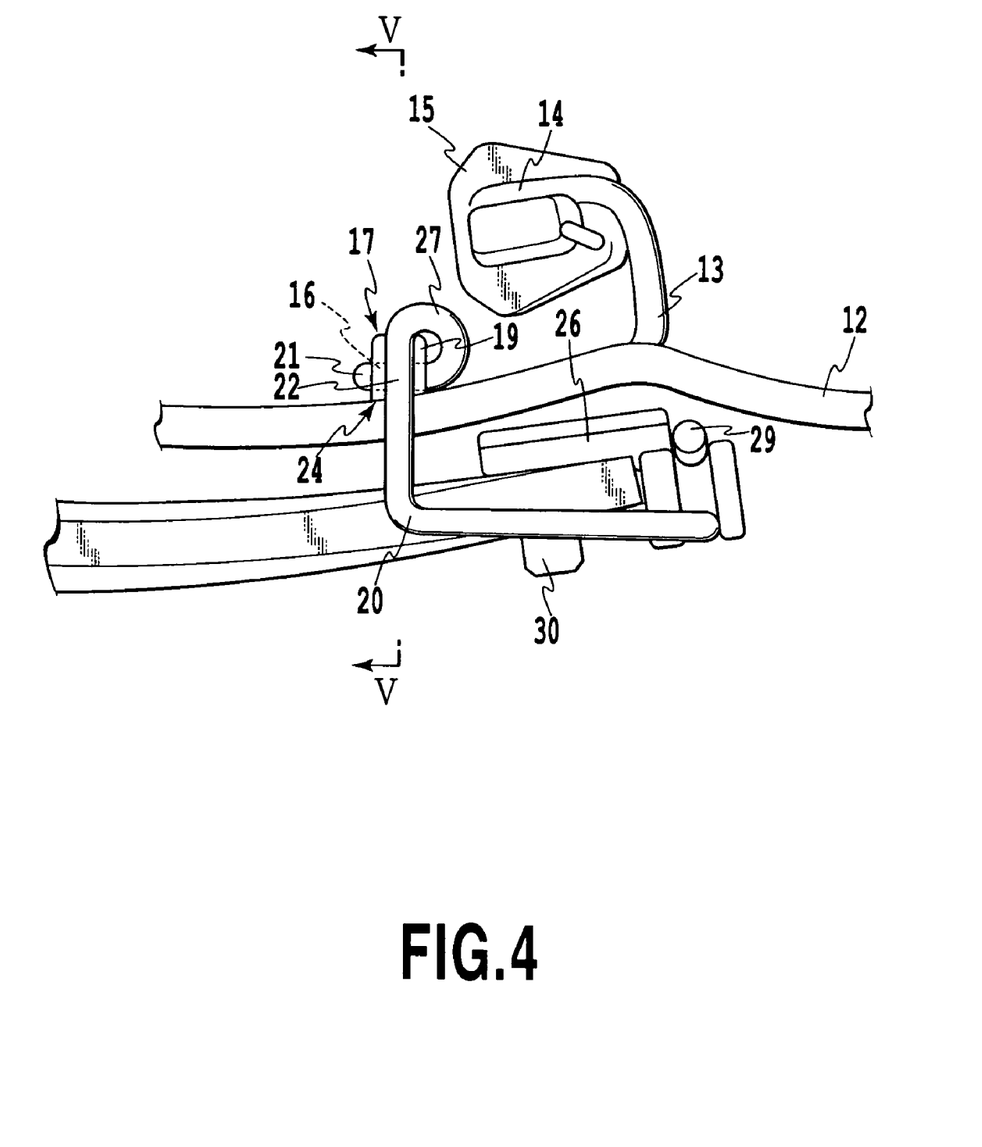
FIG. 4 is an enlarged view of a portion IV shown by an arrow in FIG. 2.
Figure 5:
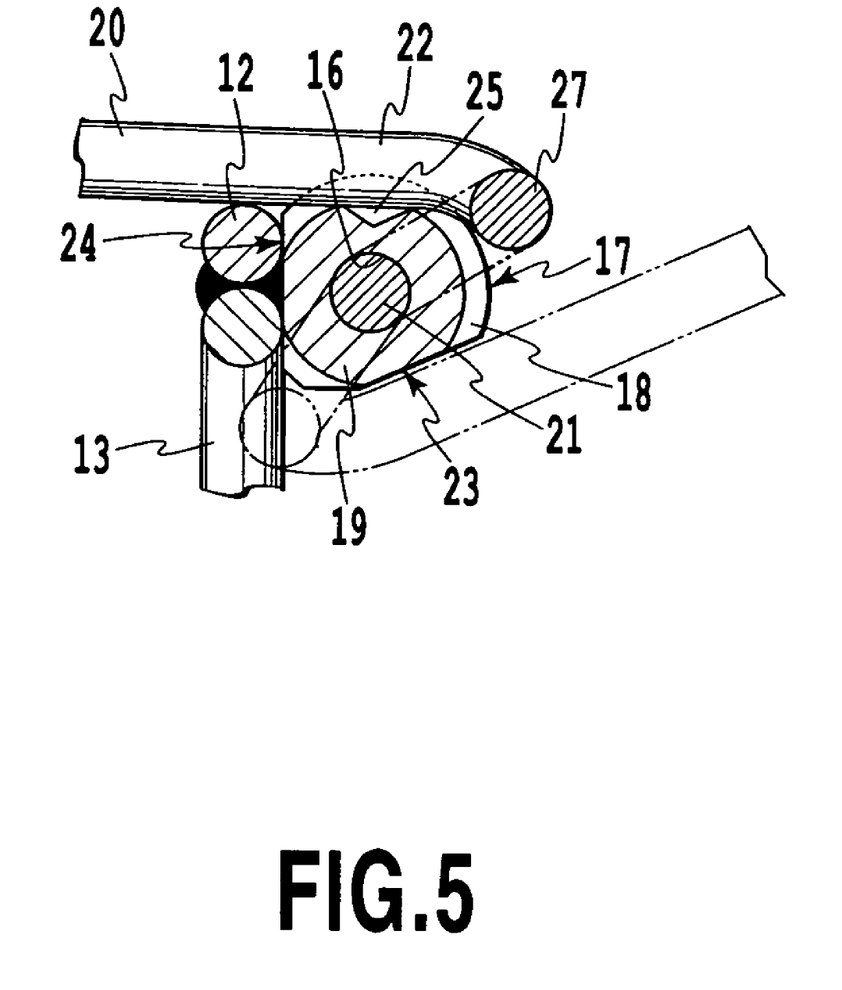
FIG. 5 is a cross-sectional view taken along a line V—V shown in FIG. 4.

FIG. 1 shows the appearance of a spectacle frame according to a first embodiment of the present invention; FIG. 2 shows a plan view thereof; FIG. 3 shows an enlarged view of the cross-section taken along a line III—III thereof; FIG. 4 shows an enlarged view of a portion shown by an arrow in FIG. 2; and FIG. 5 is a cross-sectional view taken along a line V—V shown in FIG. 4. A spectacle frame 10 according to this embodiment is classified to a so-called rimless type one-point metallic frame. This one-point metallic frame is characteristic in design that it is formed solely of metallic wires as a whole without using any screws or the like.

In a central portion of a generally linear brow bar 12 having left and lug sections 11; i.e., a portion corresponding to a bridge; proximal ends of left and right pad arms 13 are integral therewith, for example, by a soldering. A wire diameter of each the pad arms 13 tapers off to the distal end thereof to form an elastically deformable clip portion 14. Left and right nose pads 15 are fixed to the distal ends of the pad arms 13 while being caught thereby due to the elastic deformation of the clip portions 14.

A pair of fixing barrels 19 are joined to a joint of the proximal end of the pad arm 13 with the brow bar 12, for example, by a brazing at a space between the pair of fixing barrels 19, each of which has a supporting hole 16 extending leftward or rightward, an outer circumference 17 of a predetermined radius of curvature located to be concentric with the supporting hole 16 and an annular groove 18 formed on the outer circumference 17 to be concentric with the supporting hole 16. An inner diameter of the supporting hole 16 approximately corresponds to a diameter of a shaft portion 21 of a lens hanger 20 described later so that a gap is formed to allow the smooth rotation of the shaft portion 21 engaging with the supporting hole. The annular groove 18 has a semicircular cross-section taken along a center axis of the supporting hole 16, a radius of curvature of which approximately corresponds to that of an engagement portion 22 of the lens hanger 20. The engagement portion 22 of the lens hanger 20 is fit into the annular groove 18.

According to this embodiment, to stabilize the joining posture of the fixing barrels 19 relative to the brow bar 12 and the pad arm 13, part of the circumference 17 of the fixing barrel 19; i.e., a front side thereof; is smoothly cut off and the brazing is carried out while it is in contact with the brow bar 12 and the pad arm 13. A cut-off portion 23 for facilitating the removal and attachment of the lens hanger 20 relative to the fixing barrel 19 at a position of the lens hanger 20 for removing the spectacle lens (see a two-dot chain line in FIG. 5) is formed in an area of the circumference 17 of the fixing barrel 19, that is, on the under side thereof adjacent to a joining surface 24 of the fixing barrel 19 relative to the brow bar 12 and the pad arm 13. A distance between the cut-off portion 23 and the center axis of the supporting hole 16 is determined to be smaller than a distance from the center line of the supporting hole 16 to a bottom surface of the annular groove 18. Both of the cut-off portion 23 and the joining surface 24 are planar in parallel to the center axis of the supporting hole 16. In part of the annular groove 18 positioned approximately opposite to the cut-off portion 23; i.e., on the upper side thereof; a stopper portion 25 is formed for defining one of rotary ends of the lens hanger 20 described later at a position using the spectacle lens (see a solid line in FIG. 5). The stopper portion 25 in this embodiment is formed by cutting off the annular groove 18 in the tangential direction thereof to be a V-shape. For the same purpose, it is possible to cut off part of the annular groove 18 in the vicinity of the cut-off portion 23 to provide a second stopper for defining a jumping-up position of the spectacle lens (see FIG. 3).

Left and right spectacle lenses L are attached, via lens connectors 26 which are lens mounting portions in the present invention, to a pair of left and right lens hangers 20 coupled to the fixing barrels 19 to be rotatable about the supporting holes 16. The lens hanger 20 formed of a metallic wire in the same manner as the brow bar 12 or the pad arm 13 includes the shaft portion 21 fitted into the supporting hole 16 of the fixing barrel 19 in a rotatable manner, the engagement portion 22 engaged with the annular groove 18 of the fixing barrel 19 and a spring portion 27 formed between the shaft portion 21 and the engagement portion 22 to bias the engagement portion 22 by a spring force toward the annular groove 18. This spring portion 27 is shaped to be a loop so that the extending direction of the engagement portion 22 is approximately vertical to the extending direction of the shaft portion 21.

Accordingly, while the shaft portion 21 is fitted into the supporting hole 16 of the fixing barrel 19, the engagement portion 22 is pressed to the annular groove 18 of the fixing barrel 19 due to the spring force of the spring portion 27, whereby the shaft portion 21 of the lens hanger 20 is prevented from coming off from the supporting hole 16 of the fixing barrel 19. That is, it is possible to remove the lens hanger 20 from the fixing barrel 19 by making the engagement portion 22 of the lens hanger 20 elastically deform to escape from the annular groove 18 onto the outer circumference 17 of the fixing barrel 19, or on the contrary, to couple a new lens hanger 20 with the fixing barrel 19. In this regard, since it is necessary to use a tool such as specific pliers in such cases, the cut-off portion 23 described before is formed on the outer circumference 17 of the fixing barrel 19 at a position corresponding to the lens-removal position of the lens hanger 20 according to this embodiment. Thereby, it is possible to easily pull out the shaft portion 21 of the lens hanger 20 from the supporting hole 16 of the fixing barrel 19 by jumping up the spectacle lens L to rotate the lens hanger 20 to the position for removing the spectacle lens as shown in FIG. 5 by a two-dot chain line so that the engagement portion 22 is disengaged from the annular groove 18 while releasing the D elastic force of the spring portion. Of course, the converse is also possible. Thereby, it is possible to solely replace the lens hanger 20 together with the spectacle lens L without replacing main parts of the spectacle frame 10 including the brow bar 12, a temple 28 described later or others. Accordingly, expenditure for the spectacle frame 10 could be saved when various kinds of spectacle lenses are purchased.

In this embodiment, it is unnecessary to provide a strong elastic force of the spring portion 27 of the lens hanger 20 applied to the fixing barrel 19 because of the rimless type, and the opening and closing of the spectacle lens L can be smoothly carried out with a slight force. However, when the pressure of the engagement portion 22 of the lens hanger 20 to the annular groove 18 of the fixing barrel 19 has reduced due to the repetition of the jumping-up operation of the spectacle lens L, the lens hanger 20 is detached from the fixing barrel 19 and the spring portion 27 is slightly deformed by using a tool such as a pair of long-nose pliers. Thus, it is returnable to the initial state.

Since the engagement portion 22 gets on the stopper portion 25 with a proper click at one of the rotational ends of the lens hanger 20 at which the spectacle lens is used, the user is informed by this click that the spectacle lens L has reached the position suitable for the use. From the position at which the spectacle lens is being used to the lens-removal position, the engagement portion 22 is pressed to the annular groove 18 of the fixing barrel 19 with a proper frictional force whereby the lens hanger 20 is smoothly rotatable together with the spectacle lens L. In other words, either one or both of the left and right spectacle lenses L can be held at an optional rotational position.

The lens connector 26 in this embodiment is caught by the lens hanger 20 via an elastically deformable clip portion 29 formed at a distal end of the lens hanger 20. The lens L is fixed to the connector 26 with an adhesive not shown while being engaged with a pin 30 of the connector 26.

A hinge 32 incorporated between the lug section 11 formed at the left or right end of the brow bar 12 and a proximal end of the temple 28 formed generally along a whole length of an end cover 31 adopts the same coupling structure as that between the fixing barrel 19 and the proximal end of the lens hanger 20 as described above. That is, a semicircular joint 35 to be joined by soldering etc. to an annular groove 34 of a hinge barrel 33 of a basically the same structure as the above-mentioned fixing barrel 19 is formed in the lug section 11. The joint 35 is fit into the annular groove 34 of the hinge barrel 33. The hinge barrel 33 of which the outer circumference 36 is circular has a supporting hole 37 extending upward and downward and an annular groove 34 formed on the outer circumference 36. While, at the proximal end of the temple 28, there are supporting shaft portion 38 to be fitted into the supporting hole 37 of the hinge barrel 33, an engagement portion 39 engageable with the annular groove 34 of the hinge barrel 33, and a spring portion 40 formed between the shaft portion 38 and the engagement portion 39 to involve an elastic force for biasing an engagement portion 39 toward the annular groove 34. This spring portion 40 is formed to be a loop shape so that the extending direction of the engagement portion 39 is approximately vertical to the extending direction of the supporting shaft portion 38.

Accordingly, in a state wherein the shaft portion 38 is fitted into the supporting hole 37 of the hinge barrel 33, the engagement portion 39 is pressed to the annular groove 34 of the hinge barrel 33 due to the elastic force of the spring portion 40, whereby the shaft portion 38 of the temple 28 is prevented from coming off from the supporting hole 37 of the hinge barrel 33. Also, the engagement portion 39 realizes the smooth rotation of the temple 28 while being guided by the annular groove 34 with a proper frictional force. In this embodiment, when the temple 28 is coupled to the brow bar 12 via the lug section 11, the shaft portion 38 of the temple 28 is pushed into the supporting hole 37 of the hinge barrel 33 while elastically deforming the engagement portion 39 together with the spring portion 40 so that the engagement portion 39 of the temple 28 enters the annular groove 34 while clearing the outer circumference 36 of the hinge barrel 33. In this embodiment, a distal end of the semicircular joint 35 in the lug section 11 functions as an opening side stopper to the temple 28.

The inventive spectacle frame may be of any types if it has a brow bar 12 capable of joining the above-mentioned fixing barrel 19. Accordingly, the lug section 11, the pad arm 13, the lens connector 26 for mounting the lens, the temple 28, the hinge 32 or others may be those having other structure than used in this embodiment. It is also possible to adopt a rimmed lens hanger.

Figure 6:
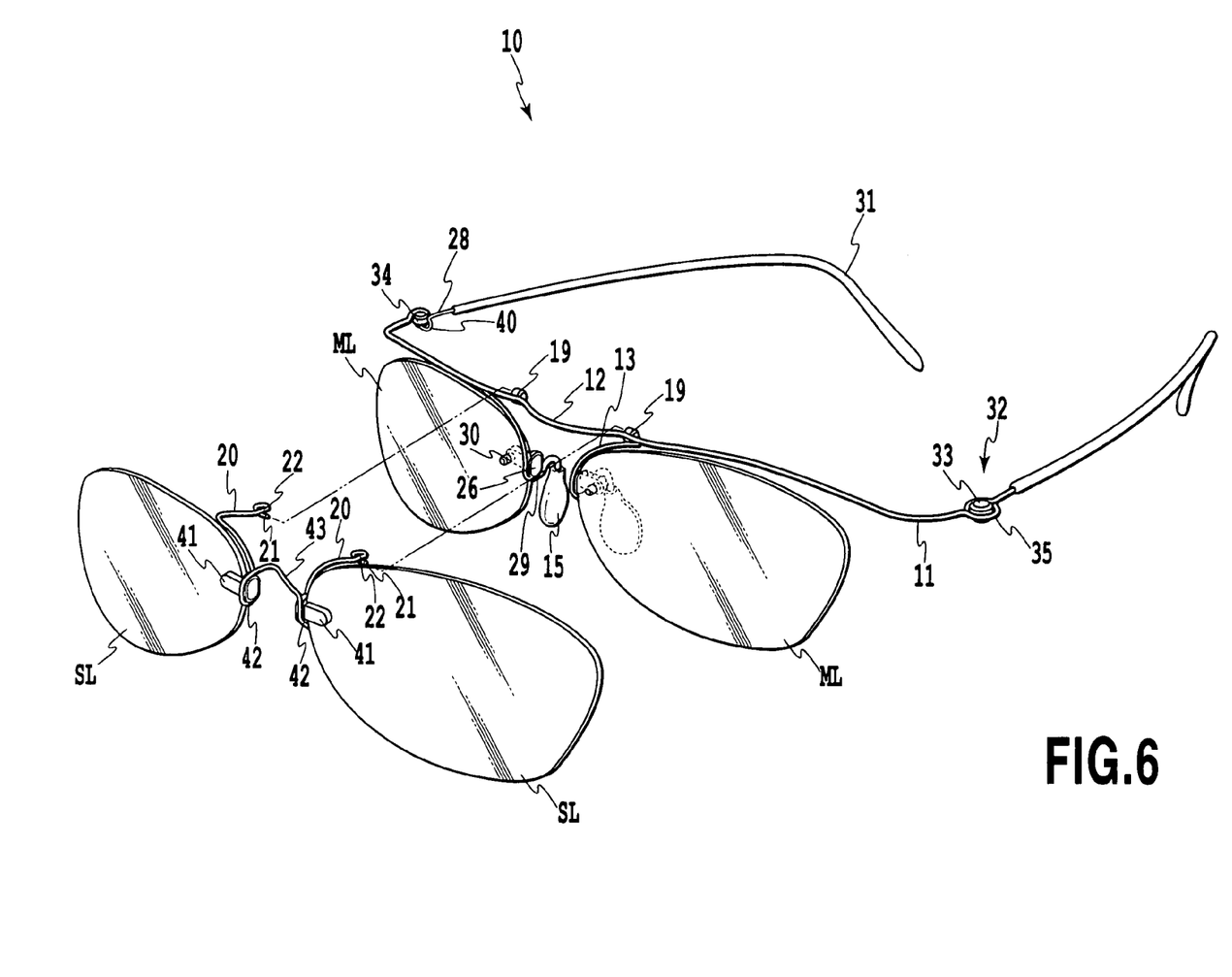
FIG. 6 is an exploded perspective view illustrating the appearance of another embodiment of the inventive spectacle frame.

In the above-mentioned embodiment, the cut-off portion 23 is formed on the fixing barrel 19 so that the left and right lens hangers 20 are easily attachable to or detachable from the fixing barrels 19 of the brow bar 12 in the spectacle frame 10 at the lens-removal position independently from each other, without using any tools. It may also be possible to prevent the lens hanger 20 from being detached from the spectacle frame 10 unless the tool is used by eliminating such a cut-off portion 23. The left and right lens hangers 20 may be coupled together via a bridge to form an integral body as shown in FIG. 6. In such a case, the left and right spectacle lenses L are rotatable at the same time in a more stable manner. When the left and right lens hangers 20 are integrally coupled together via the bridge, the shaft portions 21 of the left and right lens hangers 20 are preferably orientated in the same direction rather than being symmetrized. Thereby, the attachment/detachment of the shaft portions 21 of the left and right lens hangers 20 relative to the left and right fixing barrels 19 of the brow bar 12 becomes easier even if the bridge or the lens hanger 20 is not flexed or the brow bar 12 is not flexed.

Figure 7:
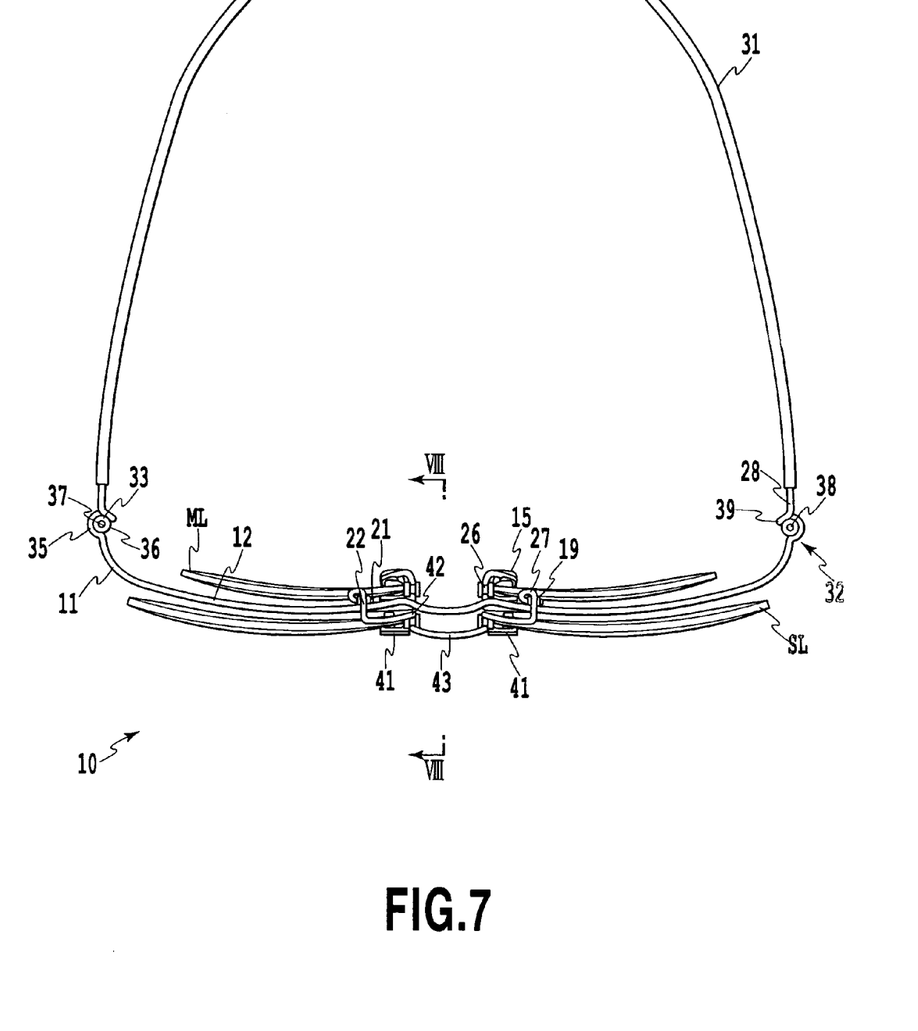
FIG. 7 is a plan view of the spectacle frame shown in FIG. 6.
Figure 8:
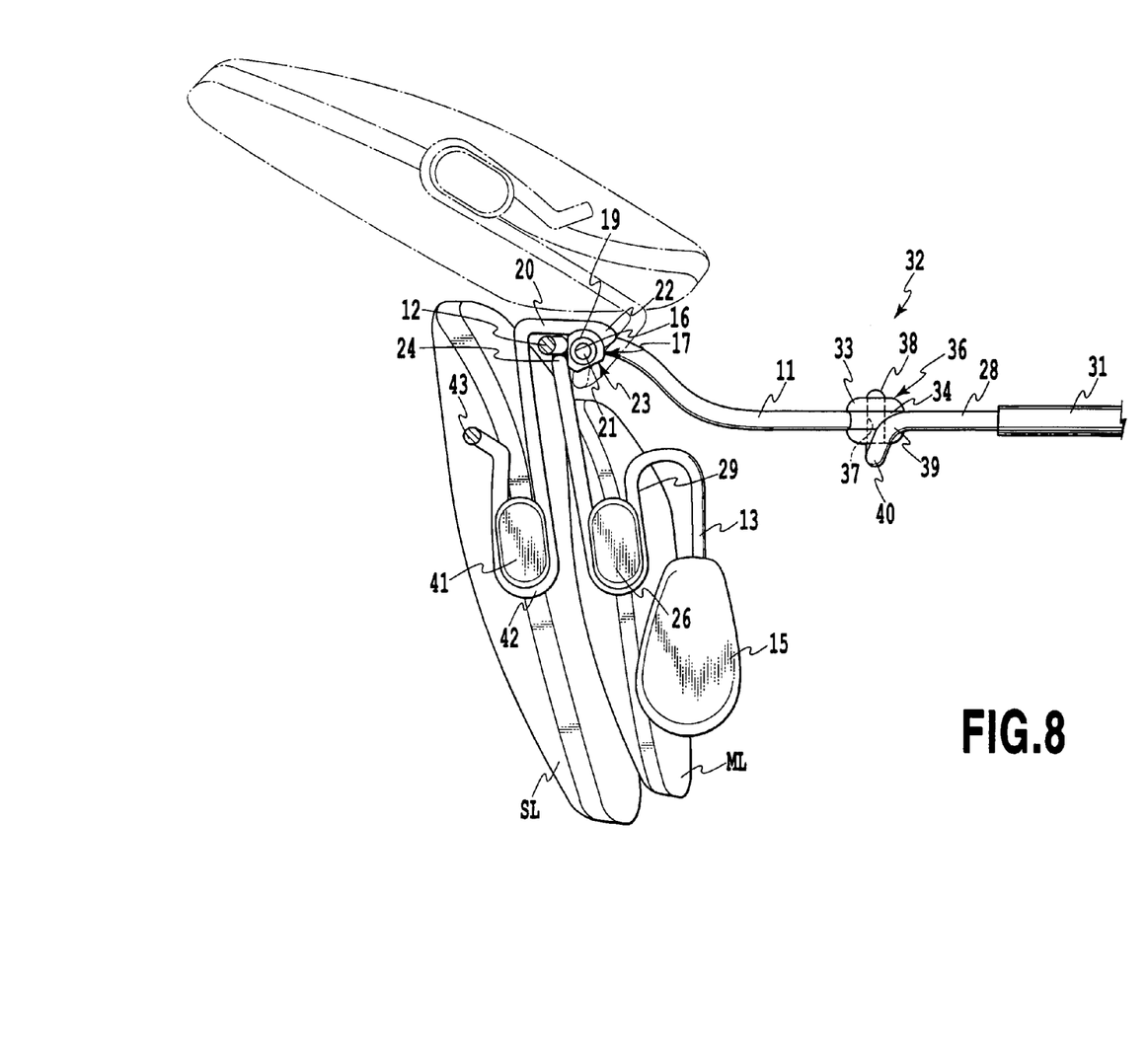
FIG. 8 is an enlarged view of a cross-section taken along a line VIII—VIII shown in FIG. 7.

Next, the appearance of another embodiment of the inventive spectacle frame using subsidiary spectacle lenses is shown together with lens hangers 20 in an exploded manner in FIG. 6, a plan view of which is shown in FIG. 7 and a cross-sectional view taken along a line VIII—VIII is shown in FIG. 8 in an enlarged manner. In this regard, the same reference numerals are given to elements therein having the same functions as those in the preceding embodiment and the redundant explanation will be eliminated. In the middle portion of a pad arm 13 of this embodiment, a clip portion 42 for catching a lens connector 41 to which a main spectacle lens ML is fixed. The main spectacle lens ML is fastened to the connector 41 fixed to the clip portion 42. The main lens ML is intended to be used basically in the same manner as the conventional one integrally fixed to the spectacle frame 10. In other words, the difference of this embodiment from the preceding one is that the pad arm 13 of the preceding embodiment is modified so that the connector 41 is fixed for mounting the main spectacle lens ML. That is, in the preceding embodiment, one to be mounted to the lens connector 26 of the lens hanger 20 is a subsidiary spectacle lens SL. This subsidiary spectacle lens SL is used while being put on the main spectacle lens SL if necessary. Of course, when the subsidiary lens SL is unnecessary, it may be detached from the spectacle frame 10. Or, it may be jumped upward.

The left and right lens hangers 20 in this embodiment are integrally coupled together via a bridge 43 so that the shaft portions 21 of the left and right lens hangers 20 are orientated in the same direction. Thereby, when the lens hangers 20 is attached to or detached from the pair of fixing barrels 19 joined to the brow bar 12, the attachment/detachment of the shaft portions 21 of the left and right lens hangers 20 can be easily carried out in the same direction without flexing the bridge and the lens hangers 20 or flexing the brow bar 12. The left and right ends of the bridge 43 continue, respectively, to the lens hangers 20 via the clip portions 14.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A spectacle frame comprising:
a brow bar coupled temples to lug sections at left and right ends thereof via hinges, respectively; and
a pair of fixing barrels joined to said brow bar and supporting proximal ends of lens hangers to be rotatable on a leftward/rightward axis, distal ends of the lens hangers being attached to spectacle lenses, respectively;
wherein said fixing barrel has a supporting hole extending leftward/rightward, an outer circumference concentric with the supporting hole, having a predetermined radius of curvature, and an annular groove provided on the outer circumference to be concentric with the supporting hole.

2. A spectacle frame as claimed in claim 1, wherein said fixing barrel further comprises a stopper portion provided in part of said annular groove, for restricting the rotation of the lens hanger at a lens-using position defined at one of rotary ends of the lens hanger.

3. A spectacle frame as claimed in claim 1, wherein said fixing barrel further comprises a cut-off portion provided in part of the outer circumference thereof, for facilitating the detachment of said lens hanger at a lens-removal position defined at the other rotary end of said lens hanger.

4. A lens hanger detachably attached to a fixing barrel joined to a brow bar of a spectacle frame as claimed in claim 3 at a proximal end thereof, said lens hanger having a lens mounting portion at a distal end thereof, and being made of metallic wires, said lens hanger comprising:
   a shaft portion fit into a supporting hole of the fixing barrel in a rotatable manner;
   an engagement portion engaged with an annular groove of the fixing barrel, and;
   a spring portion formed between said shaft portion and said engagement portion, involving an elastic force for biasing said engagement portion toward the annular groove.

5. A lens hanger as claimed in claim 4, further comprising a bridge having left and right ends joined to lens mounting portions, respectively, wherein said left and right shaft portions are orientated in the same direction.

6. A spectacle frame as claimed in claim 1, further comprising a pad arm connected to said brow bar at a proximal end thereof and having a nose pad attached to a distal end thereof.

7. A spectacle frame comprising:
   a brow bar coupled temples to lug sections at left and right ends thereof via hinges, respectively;
   a pair of lens hangers, each having a lens mounting portion at a distal end thereof, and;
   a pair of fixing barrels joined to said brow bar and supporting proximal ends of said lens hangers to be rotatable on a leftward/rightward axis;
   wherein said fixing barrel has a supporting hole extending leftward/rightward, an outer circumference concentric with the supporting hole, having a predetermined radius of curvature, and an annular groove formed on the outer circumference, and
   wherein said lens hanger is made of a metallic wire and has a shaft portion fit in a rotatable manner into the supporting hole of said fixing barrel, an engagement portion engageable with the annular groove of said fixing barrel, and a spring portion provided between the shaft portion and the engagement portion to elastically bias the engagement portion toward the annular groove.

8. A spectacle frame as claimed in claim 7, further comprising a bridge for coupling said left and right lens hangers together to be an integral body via the lens mounting portions.

9. A spectacle frame comprising:
   a brow bar coupled temple to lug sections at left and right ends thereof via hinges, respectively;
   pad arms joined to said brow bar at proximal ends thereof and carrying nose pads at distal ends thereof;
   main lens mounting portions provided midway of said pad arms, and;
   a pair of fixing barrels joined to said brow bar so that a proximal end of a lens hanger which distal end is attached to a subsidiary spectacle lens lapped on main spectacle lens is rotatable on a leftward/rightward axis;
   wherein said fixing barrel has a supporting hole extending through the same in the leftward/rightward direction, an outer circumference concentric with the supporting hole, having a predetermined radius of curvature, and an annular groove formed on the outer circumference thereof.

10. A spectacle frame as claimed in claim 9, wherein said fixing barrel further comprises a cut-off portion formed in part of the outer circumference thereof, for facilitating the detachment of the lens hanger at a lens-removal position defined at one rotary end of the lens hanger.

11. A lens hanger detachably attached to a fixing barrel joined to a brow bar of a spectacle frame as claimed in claim 10 at a proximal end thereof, said lens hanger having a lens mounting portion at a distal end thereof, and being made of metallic wires, said lens hanger comprising:
   a shaft portion fit into a supporting hole of the fixing barrel in a rotatable manner;
   an engagement portion engaged with an annular groove of the fixing barrel, and;
   a spring portion formed between said shaft portion and said engagement portion, involving an elastic force for biasing said engagement portion toward the annular groove.

12. A lens hanger as claimed in claim 11, further comprising a bridge having left and right ends joined to subsidiary lens mounting portions, respectively, wherein said left and right shaft portions are orientated in the same direction.

* * * * *